US012409468B2

(12) United States Patent
Kamerath et al.

(10) Patent No.: US 12,409,468 B2
(45) Date of Patent: Sep. 9, 2025

(54) SYSTEMS AND METHODS FOR A SPA JET SELECTIVELY ADJUSTABLE ALONG A WIDTH

(71) Applicant: BULLFROG INTERNATIONAL, LC, Herriman, UT (US)

(72) Inventors: Christopher Kamerath, Herriman, UT (US); Eric Hales, Eagle Mountain, UT (US); Todd Anderson, Lehi, UT (US); Michael Andersen, American Fork, UT (US)

(73) Assignee: Bullfrog International, LC, Herriman, UT (US)

( * ) Notice: Subject to any disclaimer, the term of this patent is extended or adjusted under 35 U.S.C. 154(b) by 487 days.

(21) Appl. No.: 17/981,880

(22) Filed: Nov. 7, 2022

(65) Prior Publication Data

US 2024/0149290 A1 May 9, 2024

(51) Int. Cl.
*B05B 15/652* (2018.01)
*B05B 15/654* (2018.01)
*E04H 4/12* (2006.01)

(52) U.S. Cl.
CPC .......... *B05B 15/652* (2018.02); *B05B 15/654* (2018.02); *E04H 4/12* (2013.01)

(58) Field of Classification Search
CPC ... B05B 3/0422; B05B 3/0463; B05B 15/652; B05B 15/654; E04H 4/12
USPC ........ 239/237, 587.4; 4/541.6, 492; 601/169
See application file for complete search history.

(56) References Cited

U.S. PATENT DOCUMENTS 4,523,340 A 6/1985 Watkins
4,679,258 A * 7/1987 Henkin .............. A61H 33/6063 4/492
4,692,950 A 9/1987 Henkin et al.
4,715,071 A * 12/1987 Henkin .............. A61H 33/6052 239/587.4
4,813,086 A 3/1989 Henkin et al.
4,920,588 A 5/1990 Watkins
5,353,447 A 10/1994 Gravatt
5,848,444 A 12/1998 Christopherson

OTHER PUBLICATIONS

European Patent Office, "Extended European Search Report," European Application No. 23207317.1, Mar. 12, 2024.

* cited by examiner

*Primary Examiner* — Steven J Ganey
(74) *Attorney, Agent, or Firm* — Dentons Durham Jones Pinegar; Sarah W. Matthews; Lilly Godfrey

(57) ABSTRACT

This disclosure relates generally to jets for spas and, more specifically, to jets that can be adjusted laterally along a width of the proximal end of the jet housing. The angular adjustment of the proximal outlet of the jet may be at least 30°. In some embodiments, the jet assembly includes a housing with a distal inlet at a distal end of the housing and a proximal outlet at a proximal end of the housing, the proximal outlet laterally adjustable along a width of the proximal end of the housing, with the proximal outlet maintaining a constant depth with respect to the proximal end of the housing as the proximal outlet is laterally adjusted along the width of the proximal end of the housing.

17 Claims, 9 Drawing Sheets

SYSTEMS AND METHODS FOR A SPA JET SELECTIVELY ADJUSTABLE ALONG A WIDTH

TECHNICAL FIELD

This disclosure relates generally to spa jets. More specifically, this disclosure relates to spa jets that can be selectively adjustable by a user along a width of the spa jet.

SUMMARY

In various aspects, systems and methods are provided for a spa jet which is adjustable along a width thereof. A spa jet assembly of this disclosure is able to have the proximal outlet, or jet nozzle, be selectively moved along a width of the proximal end of the jet, to provide a user of the spa with the desired water therapy effects.

According to one embodiment, an adjustable spa jet can include a housing with a distal inlet at a distal end of the housing and a proximal outlet at a proximal end of the housing. The proximal outlet may be laterally adjustable along a width of the proximal end of the housing, with the proximal outlet maintaining a constant depth with respect to the proximal end of the housing as the proximal outlet is laterally adjusted along the width of the proximal end of the housing.

According to another aspect, the angular adjustment of the proximal outlet with respect to the distal inlet is at least 30°.

According to another aspect, the proximal end of the housing can also comprise a selectively sealable channel formed therein, and the proximal outlet may be moveable within the selectively sealable channel to adjust a position of the proximal outlet within the channel.

In another embodiment, an adjustable jet system includes a housing with a distal end and a proximal end. The distal end may have a distal inlet for receiving water. The proximal end may have a proximal outlet, with a channel formed in the proximal end. The proximal outlet may be moveable within the channel to adjust a position of the proximal outlet within the channel.

In some embodiments a tube may fluidly couple the distal inlet to the proximal outlet. The tube may be formed of a flexible material. In one specific embodiment, the tube may be formed of a distal portion of tubing and a proximal portion of tubing, the distal portion of tubing and the proximal portion of tubing in telescoping connection.

According to another aspect, a distal joint may be in fluid connection with the distal inlet and the tube. Similarly, a proximal joint may be in fluid connection with the proximal outlet and the tube. In one specific embodiment, the distal joint may be in fluid communication with the distal inlet and the distal portion of tubing to pivotably connect the distal portion of tubing to the distal inlet. Similarly, the proximal joint may be in fluid communication with the proximal outlet and the proximal portion of tubing to pivotably connect the proximal portion of tubing to the proximal outlet.

According to another aspect, as the proximal outlet is moved from a first position within the channel to a second position within the channel, the telescoping connection of the distal portion of tubing and the proximal portion of tubing adjusts a length of the tube from a first length to a second length.

In some embodiments, at least a portion of the distal pivot is integral to the distal portion of tubing, and at least a portion of the proximal pivot is integral to the proximal portion of tubing.

According to one aspect, the distal pivot comprises a hinge joint and the proximal pivot comprises a hinge joint. More specifically, the distal pivot may comprise an eyeball fitting and the proximal pivot may comprise an eyeball fitting.

According to another aspect, the jet system also includes a jet face plate in connection with the proximal joint. The jet face plate comprises an aperture therethrough forming the proximal outlet for allowing water from the tube to flow through the jet face plate. The jet face plate may extend from the proximal joint, through the channel formed in the proximal end, to the proximal end of the housing, with the jet face plate slidable within the channel. In other configurations, the proximal joint extends from the jet face plate, through the channel formed in the proximal end, to the proximal end of the tube, with the proximal joint slidable within the channel.

According to another aspect, the proximal outlet has an angular adjustment of at least 25 degrees relative to the distal inlet.

According to another aspect, a channel formed in the proximal end has a first side and a second side, and wherein the proximal joint is slidable from the first position at the first side with a first angular degree with respect to the distal joint, to a third position at the second side with a second angular degree with respect to the distal joint, and wherein a difference between the first angular degree and the second angular degree is at least 35 degrees.

According to another aspect, the proximal outlet has a constant depth with respect to the proximal end of the housing along the channel.

In another embodiment, an adjustable jet system includes a housing having a distal end and a proximal end, the distal end having a distal inlet for receiving water and the proximal end having a channel formed therein along a width. The housing may include a tube connecting the distal inlet to a proximal outlet to transfer water from the distal inlet to the proximal outlet. The proximal outlet may be moveable along the channel to adjust a position of the proximal outlet within the channel along the width of the proximal end of the housing, with the proximal outlet maintaining a constant depth with respect to the proximal end of the housing as the proximal outlet is moved along the channel.

The tube may be formed of flexible material to allow the tube to connect the distal inlet to the proximal outlet as the proximal outlet is moved along the channel. Or, the tube may be formed of a distal portion of tubing and a proximal portion of tubing, the distal portion of tubing and the proximal portion of tubing in telescoping connection to allow the length of the tube to adjust as the proximal outlet is moved along the channel.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
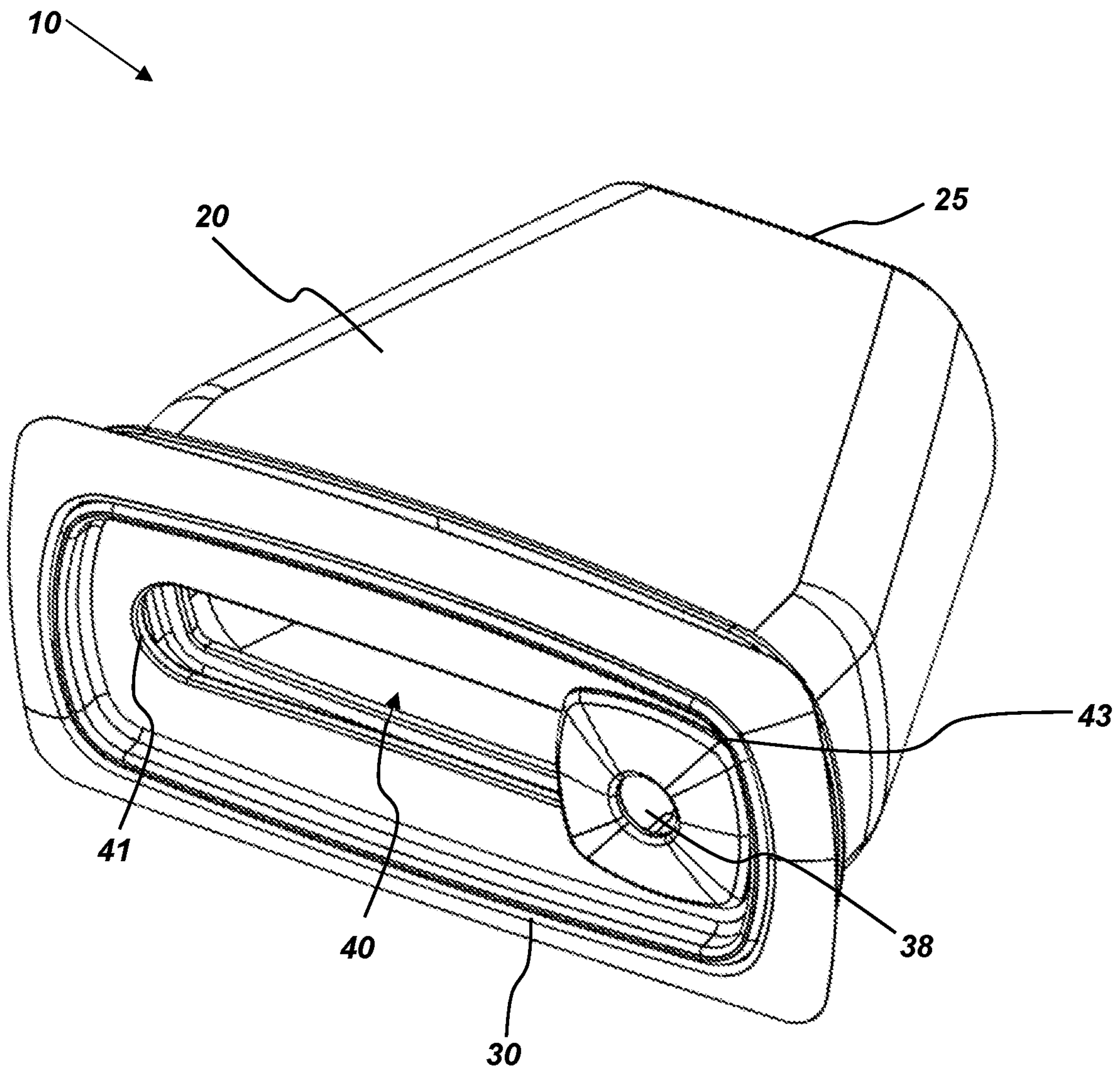
FIG. 1 provides a perspective view of an embodiment of a jet system according to this disclosure.
Figure 2:
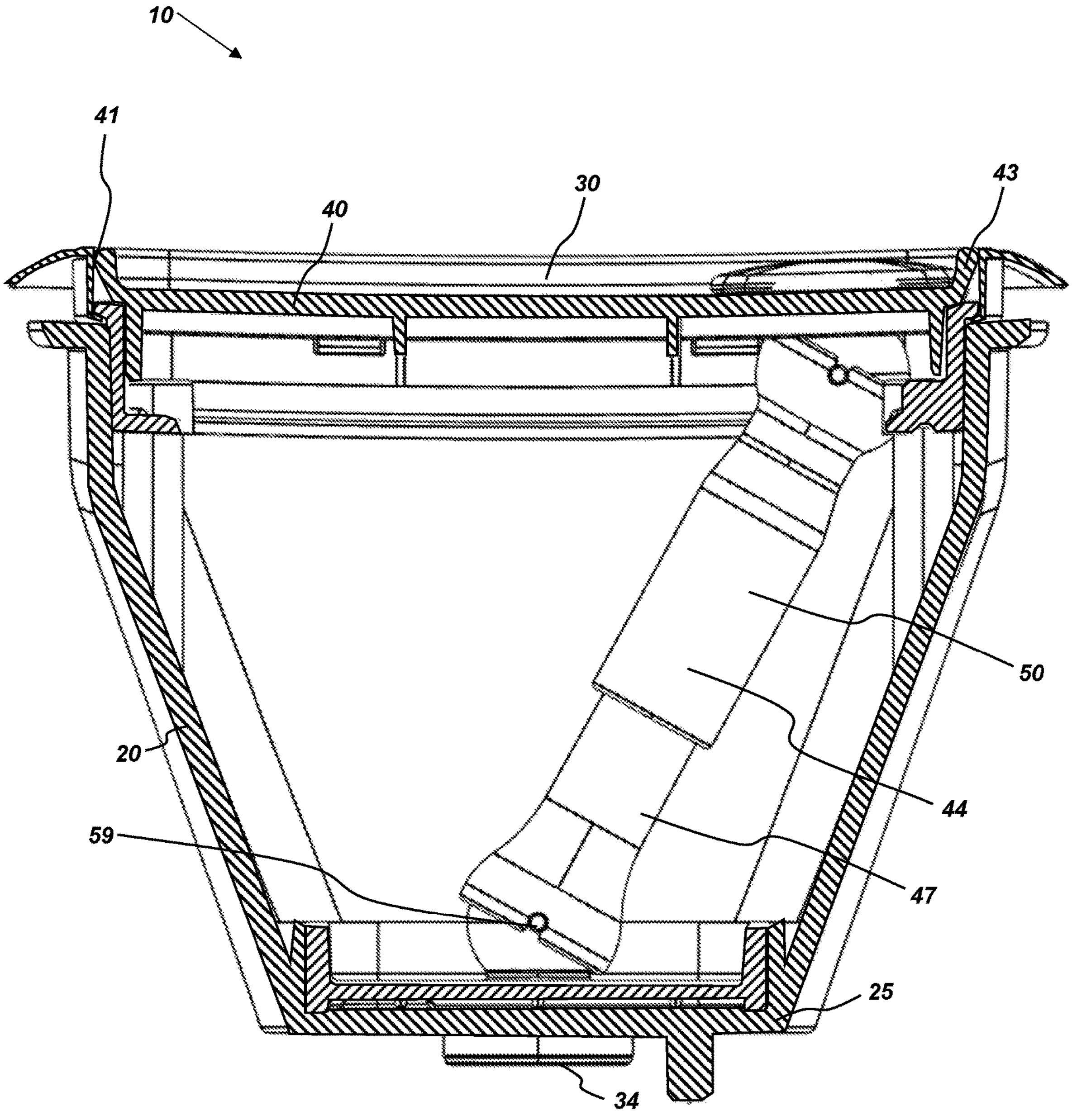
FIG. 2 provides a cross-sectional view of the embodiment of the jet system shown in FIG. 1.

FIGS. 1-5 illustrate an embodiment of a jet system or jet assembly 10. The jet system 10 includes a housing 20 with a distal end 25 and a proximal end 30. The distal end 25 includes a distal inlet 34 for receiving water, and the proximal end 30 includes a proximal outlet 38 for water to exit the housing 20. A channel 40 is formed in the proximal end 30, and the proximal outlet 38 may be movable within the channel 40 (such as slidable along a length of the channel 40, etc.). The channel 40 can extend from a first side 41 to a second side 43. In some embodiments, the channel 40 extends substantially along a width of the proximal end 30 of the housing. In other embodiments, the channel is shorter or longer as desired. The channel 40 may be placed in the middle of the proximal end 30, placed to one side or the other, etc.

The housing 20 can be any suitable shape and dimensions. In some embodiments the housing 20 has a narrower distal end 25 and a wider proximal end 30. The wider proximal end can allow for a wider channel 40 along the width of the proximal end. The length of the housing 20 from the distal end 25 to the proximal end 30 may be from about 9 centimeters to about 10 centimeters. In other embodiments, the length of the housing 20 from the distal end 25 to the proximal end 30 may be from about 5 centimeters to about 20 centimeters, from about 10 to 15 centimeters, or about 10 centimeters. Or the length of the housing 20 from the distal end 25 to the proximal end 30 may be shorter or longer as desired.

The width of the housing 20 at the proximal end 30 may be any suitable width. In some embodiments, the width of the housing 20 at the proximal end 30 may be from about 5 centimeters to about 20 centimeters, from about 7 centimeters to about 15 centimeters, or about 12 centimeters. The width of the housing 20 at the proximal end 30 may be shorter or longer as desired. The channel 40 may have a width that is slightly shorter than the width of the housing 20 at the proximal end 30. For example, the width of the channel may be from about 3 centimeters to about 18 centimeters, from about 5 centimeters to about 13 centimeters, from about 8 centimeters to about 10 centimeters, etc. Or the width of the channel 40 may be shorter or longer as desired. The channel 40 may be centered within the proximal end 30, or in other embodiments it may be placed towards one side or the other as desired.

In some embodiments, a tube 44 fluidly couples the distal inlet 34 to the proximal outlet 38. Tube 44 may be a portion of tubing, a hose, a line, or any other fluid conduit. The tube 44 can have any suitable shape and dimensions. In one embodiment, the tube 44 is formed of a distal portion of tubing 47 and a proximal portion of tubing 50. The distal portion of tubing 47 and the proximal portion of tubing 50 may be in telescoping connection, such that the distal portion of tubing 47 telescopes within the proximal portion of tubing 50 (or vice versa). With a telescoping connection, the length of the tube 44 can change as the proximal outlet 38 moves within channel 40. In other embodiments, a tube is not provided.

Figure 3:
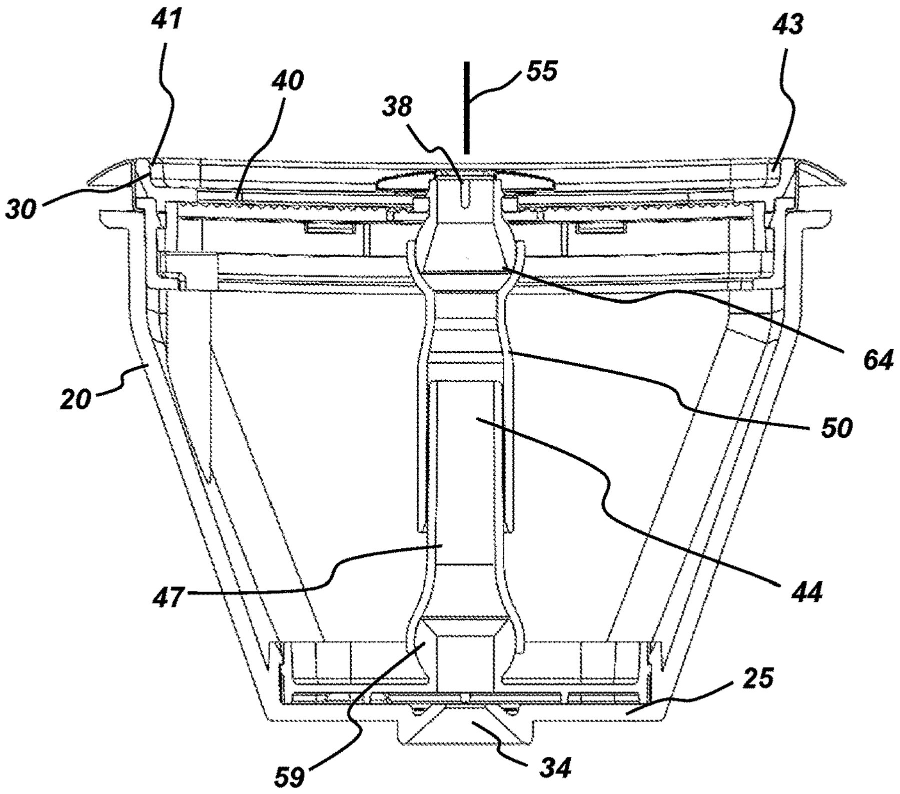
FIG. 3 provides another cross-sectional view of the embodiment of the jet system shown in FIG. 1 with the proximal outlet in a first, center position.
Figure 4:
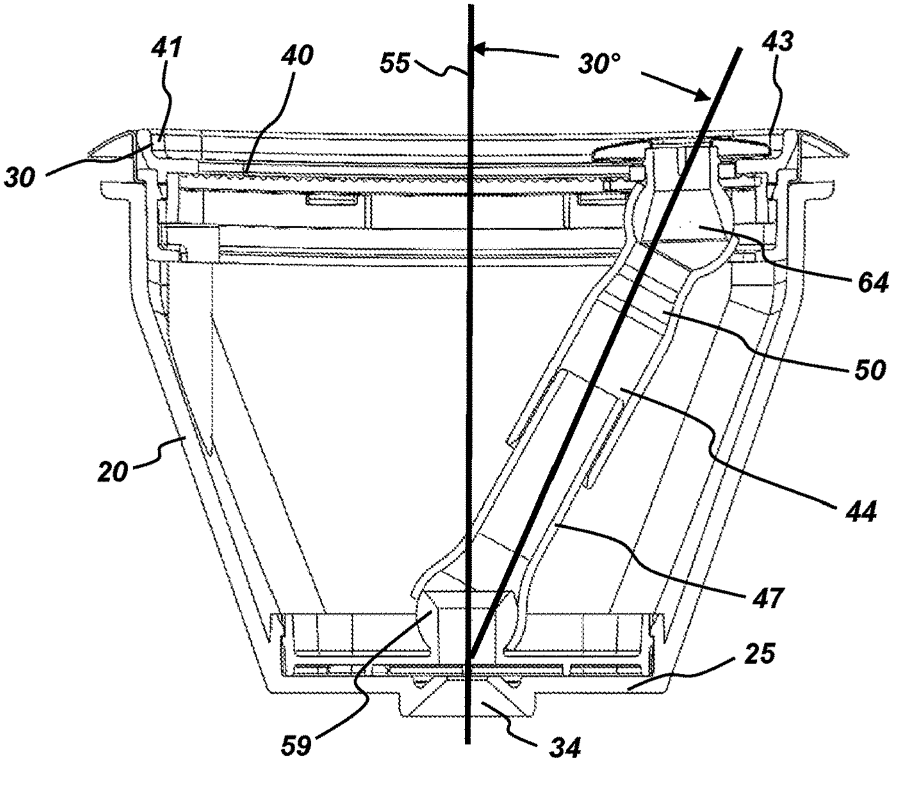
FIG. 4 provides another cross-sectional view of the embodiment of the jet system shown in FIG. 1 with the proximal outlet in second position.
Figure 5:
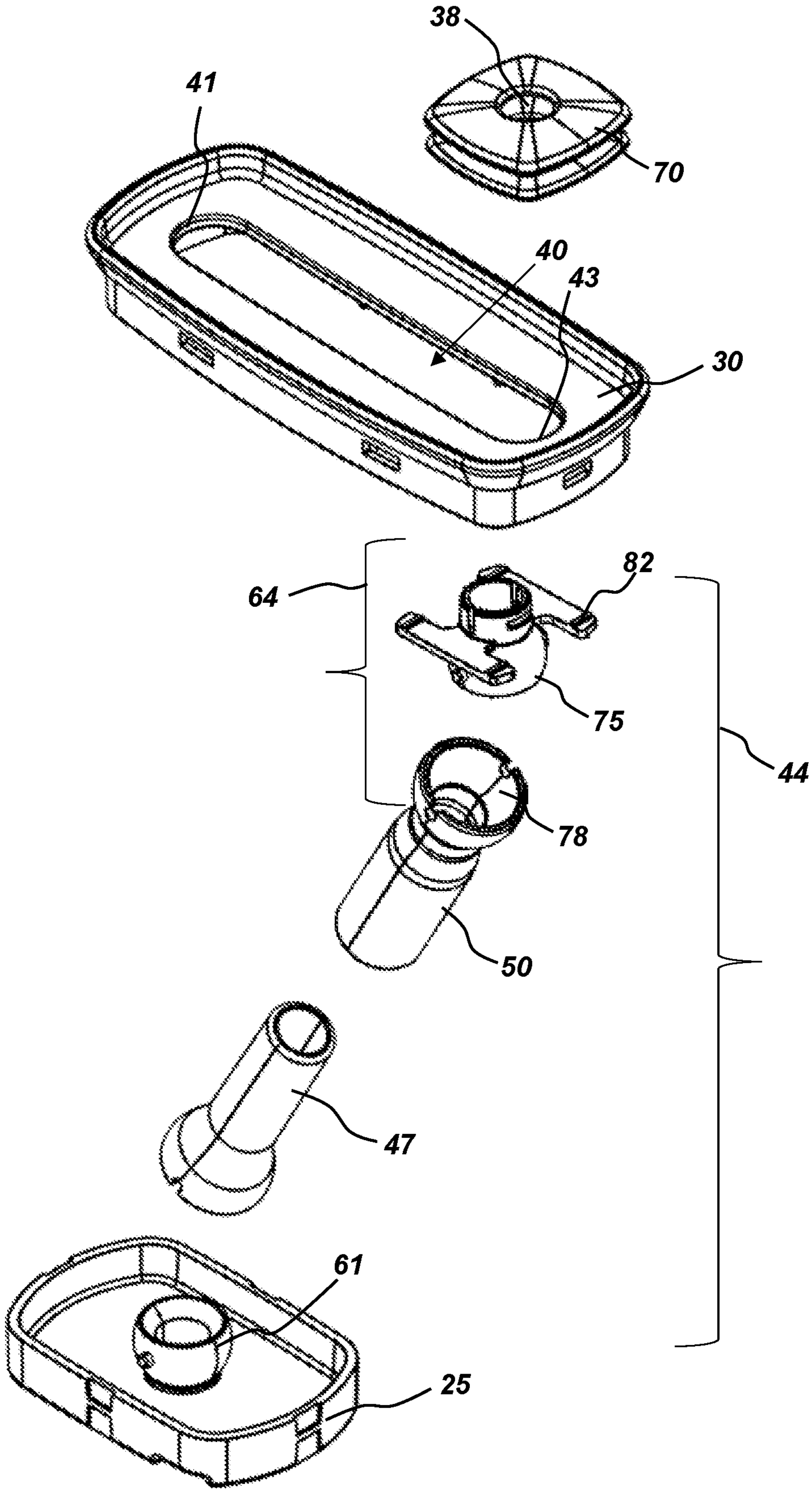
FIG. 5 provides an exploded view of interior portions of an embodiment of a jet assembly.
Figure 6:
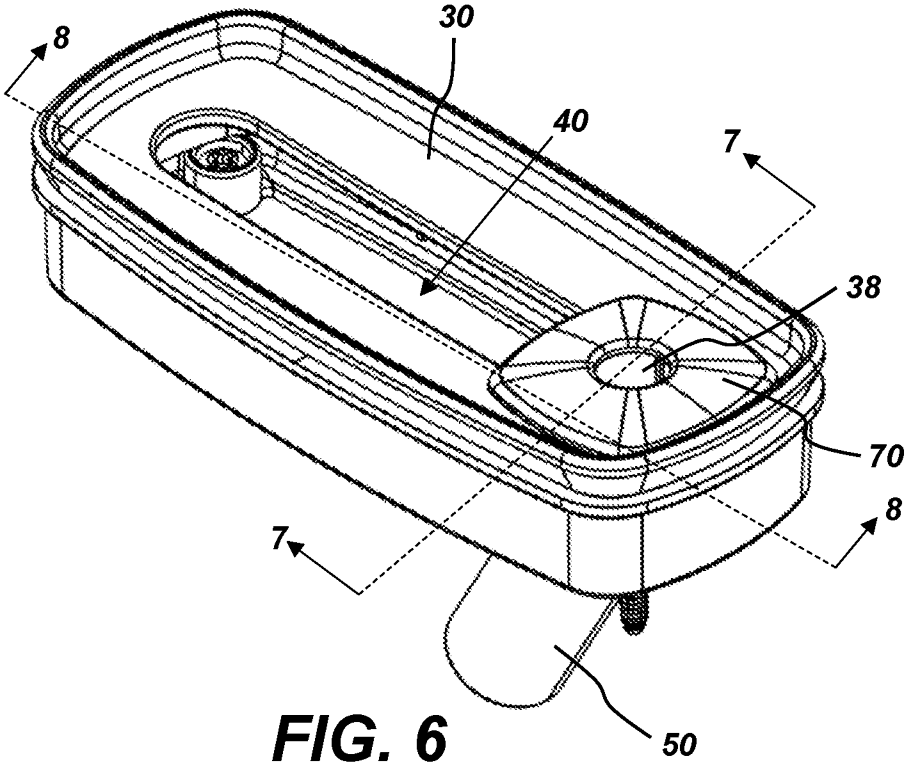
FIG. 6 provides a perspective view of portions of an embodiment of a proximal end of a jet assembly.
Figure 7:
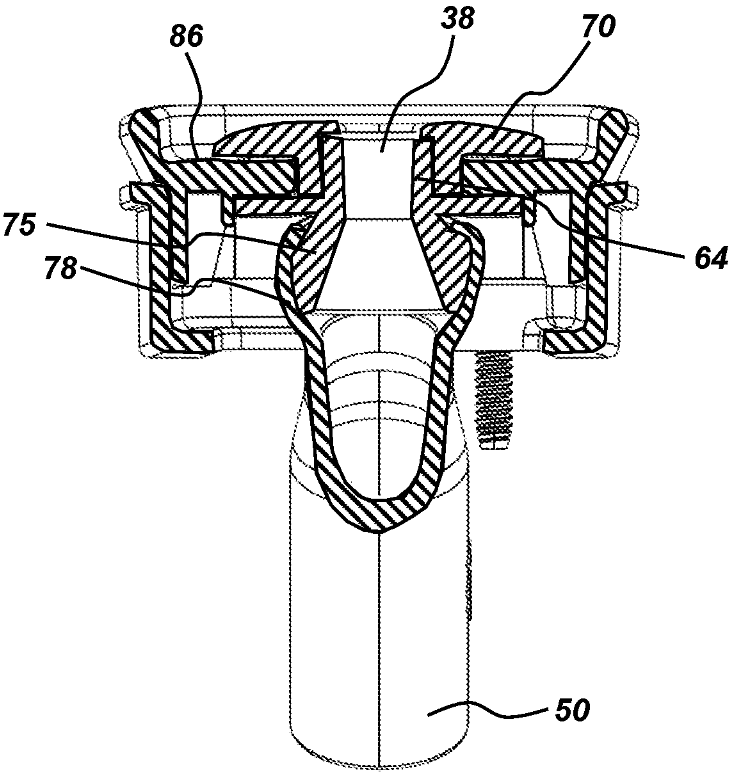
FIG. 7 provides a cross-sectional representation of the proximal end of the jet assembly of FIG. 6, taken along line 7-7 of FIG. 6.

With reference to FIGS. 3 and 4, the proximal outlet 38 is shown in a first position (FIG. 3) and a second position (FIG. 4). FIG. 3 illustrates the proximal outlet 38 in a first, center position. This first position is along a generally longitudinal line 55 that extends from the distal inlet 34 to the center of the proximal end 30 of the housing 20. In other words, the proximal outlet 38 is at or near a center of the channel 40, in embodiments where the channel 40 is centered along the proximal end 30. The tube 44 has a first length in this first, center position.

FIG. 4 illustrates the proximal outlet 38 in a second position, at or near the second side 43 of the channel 40. The proximal outlet 38 is slidable within the channel 40, and can be moved from the first position to the second position by a user pressing the proximal outlet 38 laterally from the first position to the second position. This second position is moved away from the center of the channel 40, or away from the longitudinal line 55 that extends from the distal inlet 34 to the proximal end 30 of the housing 20. The tube 44 has a second length in this second position, and the second length in the second position is greater than the first length in the first position illustrated in FIG. 3.

One or more joints may connect the tube 44 to the distal inlet 34 and/or proximal outlet 38. Joint(s) may provide a mechanical connection that allows for angular movement or adjustment. For example, a joint may be used to connect the tube 44 to the distal inlet 34 and/or proximal outlet 38. The joint may allow a portion of the tube to rotate relative to a stationary portion. In some configurations, a first joint 59 may allow the distal portion of tubing 47 to rotate relative to a stationary portion of distal portion of tubing 47, and/or a second joint 64 may allow the proximal portion of tubing 50 to rotate relative to a stationary portion of proximal portion of tubing. By way example and not limitation, the joint may be a rotary eyeball, a pivot joint, a rotary joint, a hinge joint, an eyeball joint, a ball-and-socket joint, an eyeball fitting, etc.

In one embodiment, the first joint 59 comprises a distal pivot joint. The distal pivot joint can be in connection with the distal inlet 34 and the distal portion of tubing 47 to connect the distal portion of tubing 47 to the distal inlet 34. Even more specifically, the distal portion of tubing 47 can be integral to a distal pivot joint. In other embodiments, other types of joints can be used, and/or the joint can be in connection with the distal portion of tubing 47 rather than integral to the distal portion of tubing 47. In one embodiment, the distal pivot joint 59 comprises a stationary portion 61 that is formed integral to the distal end 25 of the housing 20 (best seen in the exploded view of FIG. 5, with the housing 20 omitted for clarity). In some embodiments, the distance from the distal joint to the proximal end 30 of the housing 20 may be at least 5 centimeters, or may be from about 5 centimeters to about 20 centimeters, or from about 8 centimeters to about 15 centimeters.

The second joint 64 may comprise a proximal pivot joint. The proximal pivot joint can be in connection with the proximal outlet 38 and the proximal portion of tubing 50 to connect the proximal portion of tubing 50 to the proximal outlet 38. In one embodiment, the proximal portion of tubing 50 can be integral to the proximal pivot joint. In other embodiments, other types of joints can be used, and/or the joint can be in connection with the proximal portion of tubing 50 rather than integral to the proximal portion of tubing 50.

With reference to FIGS. 5-9, the proximal outlet 38 may be movable within channel 40 in any suitable manner. The proximal outlet 38 can also be referred to as a jet nozzle, and is typically the portion of the jet that interfaces with the user to provide hydrotherapy effects. In the embodiment illustrated in FIG. 5, the adjustable jet system 10 may also include a jet face plate 70. The jet face plate 70 includes an aperture to allow water to flow through the jet face plate 70, and in this embodiment the aperture of the jet face plate forms the proximal outlet 38. The jet face plate 70 can be in fluid connection with the proximal end of the tube 44, such that water flows from the proximal end of the tube 44 through the jet face plate 70, and exits the proximal outlet 38.

In embodiments where the proximal end of the tube 44 is in connection with a proximal joint 64 (such as a ball-and-socket joint, an eyeball joint, a hinge joint, etc.), the jet face plate 70 can be in connection with the proximal joint 64. For example, the proximal joint 64 can extend through the channel 40, and interface or friction fit with the jet face plate 70, as best seen in the cross-sectional view of FIG. 7.

Figure 8:
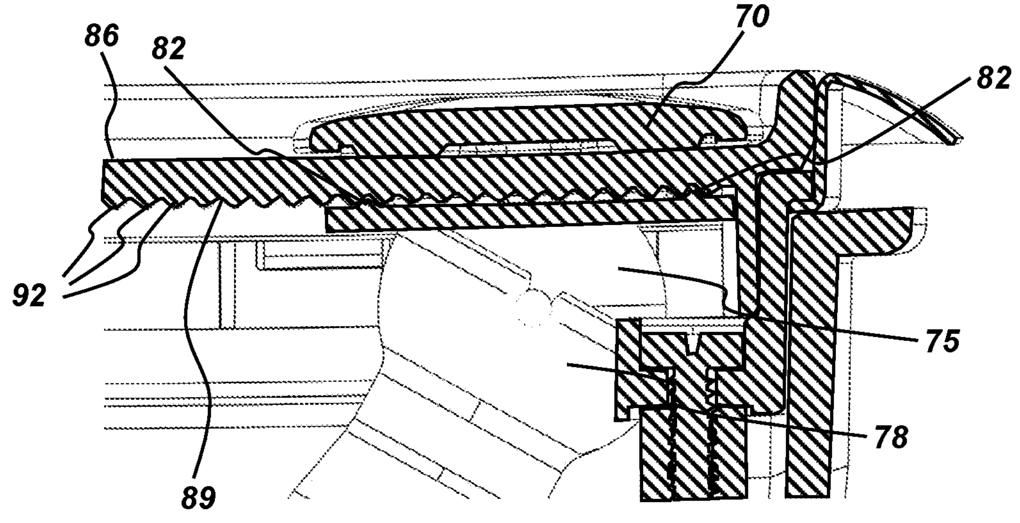
FIG. 8 provides a cross-sectional representation of the proximal end of the jet assembly of FIG. 6, taken along line 8-8 of FIG. 6.
Figure 9:
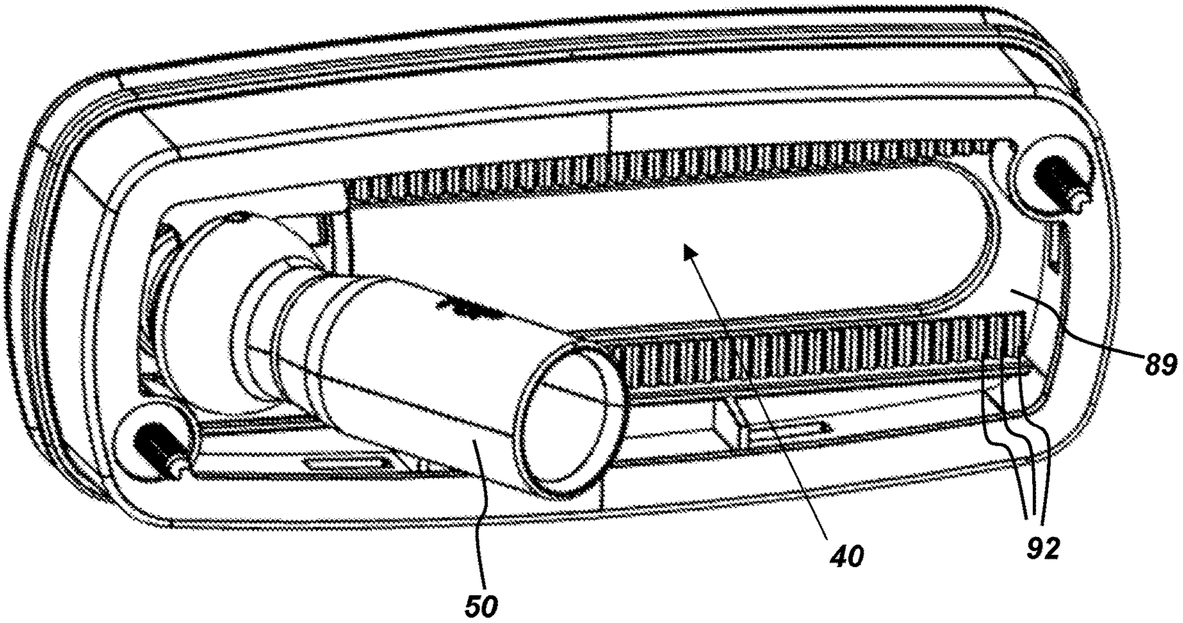
FIG. 9 provides a rear perspective view of the proximal end of the jet assembly of FIG. 6.

With reference to FIGS. 8-9, in some embodiments, the proximal joint 64 includes a stationary portion 75 and a rotating portion 78. The stationary portion 75 may be connected to the jet face plate 70. The stationary portion 75 and/or the jet face plate 70 may include one or more elements to interface with the proximal end 30 of the housing 20, as the stationary portion 75 of the proximal joint 64 and/or the jet face plate 70 move along the channel 40. For example, the stationary portion 75 and/or the jet face plate 70 may include one or more ridged portions. In the embodiment shown in FIG. 8-9, the stationary portion 75 comprises two projections 82 (positioned approximately one on each end, projections 82 on the stationary portion 75 of the proximal joint 64 also visible in the exploded view of FIG. 5). In other embodiments, a single projection can be used, or more projections, and the projections can be placed as desired on the stationary portion of the proximal joint 64.

The proximal end 30 of the housing 20 can include an exterior face 86 and an interior face 89, with the channel 40 extending through the proximal end 30 of the housing 20 from the exterior face 86 to the interior face 89. The interior face 89 of the proximal end 30 of the housing 20 can include one or more elements to interface with the jet face plate 70 and/or stationary portion 75 of the proximal joint 64. In the embodiment shown in FIGS. 8-9, the interior face 89 of the proximal end 30 comprises a plurality of projections 92. Projections 92 may be placed substantially along the width of the channel 40, on one side of the channel, on both sides, etc.

In this embodiment, as the projections 92 of the proximal end 30 can interface with the projections 82 of the proximal joint 64. As the projections and detents on each piece pass each other, it creates portions that are more difficult to pass and easier to pass, as the projections pass each other, a physical clicking occurs. This can be a convenient physical feedback to allow users of the jet to know they are successfully adjusting the proximal outlet within the channel 40. This can also ensure that the proximal outlet 38 or jet nozzle is not accidentally adjusted, as the projections 82 on the proximal joint 62 must be pushed past the projections 92 on the interior face 89 of the proximal end 30 to adjust the proximal outlet 38 laterally within the channel 40.

In use, the jet assembly or jet system 10 is installed in a spa shell, with the proximal end 30 of the housing 20 inside a spa shell, or where the user sits when the user is using the spa. The proximal end 30 with the proximal outlet 38 or jet nozzle within the spa shell where a user sits when using the spa allows the jet system or jet assembly 10 to provide hydrotherapy benefits to the user. The distal inlet 34 may be connected to a water supply to receive water. Water flows from the distal inlet 34 to the proximal outlet 38.

During use, water enters the distal inlet 34 of the spa jet assembly. The water then enters the tube 44 and travels to the proximal outlet 38 or jet nozzle and exits the spa jet assembly. The force from the fluid flow as it exits the spa jet assembly through the proximal outlet 38 can provide hydrotherapy to users, and a user may adjust the exact position for hydrotherapy by adjusting the proximal outlet 38 within the channel 40.

Some embodiments include a tube that extends from the distal inlet 34 to the proximal outlet 38. In such embodiments, water flows from the distal inlet 34 to the proximal outlet 38 through the tube 44. As the user desires to adjust the position of the proximal outlet 38, the user may press the proximal outlet 38 laterally, and move the proximal outlet 38 along the width of the channel 40. The channel 40 may have a width that allows a high degree of angular adjustment for the proximal outlet 38, while also keeping the proximal outlet at a fixed depth with respect to the distal inlet 34.

The angular adjustment of the jet assembly or jet system 10 can be measured relative to an imaginary line (indicated as 55 in FIG. 3) drawn through the center of the housing 20, from the distal inlet 34 to the proximal end 30 of the housing 20. If this line is taken as 0° of angular adjustment, the movement of the proximal outlet 38 away from this center line results in a degree of angular adjustment as measured relative to the distal inlet 34.

For example, as shown in FIG. 4, as the proximal outlet 38 is positioned toward a second side 43 of the channel 40, the angle of the proximal outlet 38 relative to the distal inlet 34 is around 30°. Similarly, as the proximal outlet 38 is positioned toward a first side 41 of the channel 40, the angle of the proximal outlet 38 relative to the distal inlet is around 30° in the other direction (or negative 30°). The total angular adjustment, from the first side 41 to the second side 43 of the channel 40, may be from about 20° to about 90°, or from about 30° to about 80°, or from about 40° to about 70°, or from about 50° to about 60°. This angular adjustment is achieved while maintaining a constant depth of the proximal outlet with respect to the proximal end 30 of the housing 20 along the channel 40. That is, the proximal outlet 38 is always located at the proximal end 30 of the jet housing, and thus maintains a strong force for hydrotherapy. This is in contrast, for example, to a standard eyeball joint, where the distance of the outlet changes as the joint rotates away from center (i.e., the distance of the outlet from the proximal end increases as the joint rotates away from center). This means that any time the joint is rotated away from center, the hydrotherapy effects actually decrease. The proximal outlet of standard eyeball joints has an annular path as the outlet rotates positions, whereas the current embodiments have a constant depth or non-annular path as the proximal outlet rotates positions.

Figure 10:
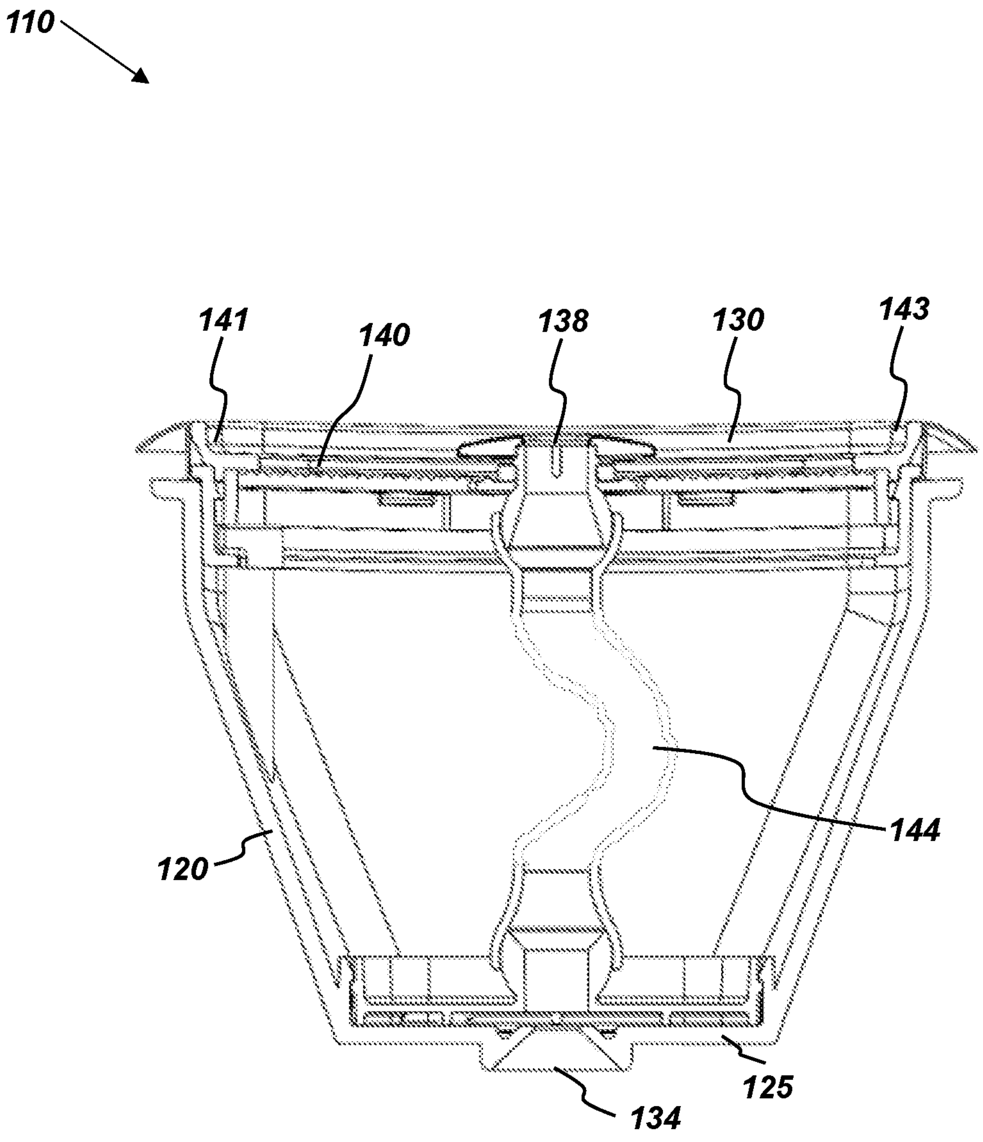
FIG. 10 provides a cross-sectional view of another embodiment of a jet system.

Another embodiment of a jet system or jet assembly 110 is shown in FIG. 10. In this embodiment, the jet system or jet assembly 110 includes a housing 120 with a distal end 125 and a distal inlet 134 for receiving water into the jet housing 120. The proximal end 130 of the housing 120 includes a channel 140 formed therein along a width of the proximal end 130 of the housing 120. A proximal outlet 138 is moveable within the channel 140 to laterally adjust the position of the proximal outlet 138. The proximal outlet 138 can also be described as a jet nozzle, and in this manner, a user can laterally adjust the proximal outlet 138 or nozzle of the jet to adjust the hydrotherapy position of the jet.

The embodiment in FIG. 10 illustrates a tube 144 connecting the distal inlet 134 to the proximal outlet 38. The tube 144 can be a flexible tube, so that it can move from positions along the length of the channel 140. The tube 144 can be any suitable shape, size, and length to transfer water from the distal inlet 134 to the proximal outlet 138. The tube 144 can be made from any suitable materials, such as plastics, etc.

Figure 11:
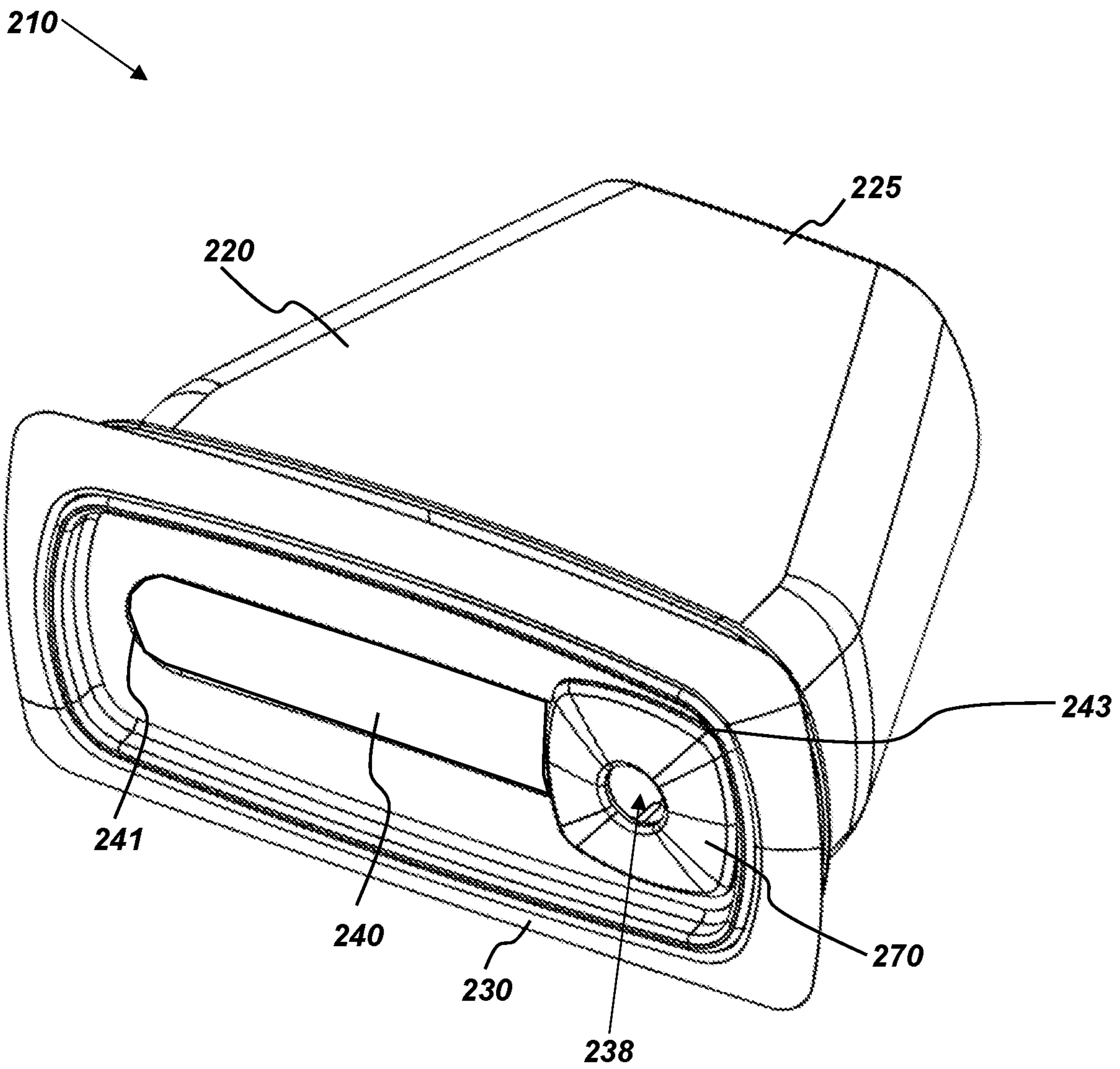
FIG. 11 provides a perspective view of another embodiment of a jet system.

FIG. 11 illustrates another embodiment of a jet assembly or jet system 210. The jet system 210 includes a housing 220 with a distal end 225 and a distal inlet 234 for receiving water into the jet housing 220. The proximal end 230 of the housing 120 includes a channel 240 formed therein along a width of the proximal end 230 of the housing 220.

The channel 240 in this embodiment is selectively sealable along the width of the channel 240. Water exits entirely, or substantially entirely, through the proximal outlet 238. The proximal outlet 238 is moveable along the selectively sealable channel 240. In some embodiments, as the proximal outlet 238 moves along the channel 240, the materials that selectively seal the channel 240 may be pressed or otherwise moved out of the channel 240. Similarly, the materials that selectively seal the channel 240 may come back together to selectively seal the channel 240 over portions where the proximal outlet 238 has moved from. In other embodiments, the proximal outlet 238 may be along a sealed ring track, and the track can be moved along the channel to change the position of the proximal outlet 238 along the width of the proximal end 230 of the housing 220.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular water-containing vessel (e.g., a spa); however, other vessels (e.g., pools, tubs, swim spas, etc.) are also contemplated. A spa is also known in the industry as a hot tub and is generally formed of a concave shell to receive and contain water. Structures, such as a jet, can extend through the concave shell to move water from a surface outside the spa to a surface inside the spa or shell. Surfaces inside the shell are referred to as more "proximal" while surfaces that extend through the shell are referred to as "distal." A proximal side of a jet faces the spa shell where the user relaxes, and the jet can provide hydrotherapy to the user in the spa.

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. An adjustable jet system, comprising:

a housing having a distal end and a proximal end;

the distal end having a distal inlet for receiving water;

the proximal end having a proximal outlet and a channel formed in the proximal end, and wherein the proximal outlet is moveable within the channel to adjust a position of the proximal outlet within the channel;

a tube for fluidly coupling the distal inlet to the proximal outlet, the tube formed of a distal portion of tubing and a proximal portion of tubing, the distal portion of tubing and the proximal portion of tubing in telescoping connection;

a distal joint in connection with the distal inlet and the distal portion of tubing to rotatably connect the distal portion of tubing to the distal inlet;

a proximal joint in connection with the proximal outlet and the proximal portion of tubing to rotatably connect the proximal portion of tubing to the proximal outlet; and wherein, as the proximal outlet is moved from a first position within the channel to a second position within the channel, the telescoping connection of the distal portion of tubing and the proximal portion of tubing adjusts a length of the tube from a first length to a second length.

2. The adjustable jet system of claim 1, wherein at least a portion of the distal joint is integral to the distal portion of tubing, and wherein at least a portion of the proximal pivot is integral to the proximal portion of tubing.

3. The adjustable jet system of claim 1, wherein the distal joint comprises a hinge joint and wherein the proximal joint comprises a hinge joint.

4. The adjustable jet system of claim 1, wherein the distal joint comprises an eyeball fitting and wherein the proximal joint comprises an eyeball fitting.

5. The adjustable jet system of claim 1, further comprising a jet face plate, the jet face plate in connection with the proximal joint, and wherein the jet face plate comprises an aperture therethrough forming the proximal outlet for allowing water from the tube to flow through the jet face plate.

6. The adjustable jet system of claim 5, wherein the jet face plate extends from the proximal joint, through the channel formed in the proximal end, to the proximal end of the housing, the jet face plate slidable within the channel.

7. The adjustable jet system of claim 5, wherein the proximal joint extends from the jet face plate, through the channel formed in the proximal end, to the proximal end of the tube, the proximal joint slidable within the channel.

8. The adjustable jet system of claim 1, wherein the proximal outlet has an angular adjustment of at least 25 degrees relative to the distal inlet.

9. The adjustable jet system of claim 1, wherein the channel formed in the proximal end comprises the channel with a first side and a second side, and wherein the proximal joint is slidable from the first position at the first side with a first angular degree with respect to the distal joint, to a third position at the second side with a second angular degree with respect to the distal joint, and wherein a difference between the first angular degree and the second angular degree is at least 45 degrees.

10. The adjustable jet system of claim 1, wherein the proximal outlet has a constant depth with respect to the proximal end of the housing along the channel.

11. An adjustable jet system, comprising:

a housing having a distal end and a proximal end, the distal end having a distal inlet for receiving water and the proximal end having a channel formed therein along a width;

a tube connecting the distal inlet to a proximal outlet to transfer water from the distal inlet to the proximal outlet, wherein the tube is formed of a distal portion of tubing and a proximal portion of tubing, the distal portion of tubing and the proximal portion of tubing in telescoping connection to allow a length of the tube to adjust as the proximal outlet is moved along the channel;

wherein the proximal outlet is moveable along the channel to adjust a position of the proximal outlet within the channel along the width of the proximal end of the housing, and wherein the proximal outlet maintains a constant depth with respect to the proximal end of the housing as the proximal outlet is moved along the channel.

12. The adjustable jet system of claim 11, wherein the tube is formed of flexible material to allow the tube to connect the distal inlet to the proximal outlet as the proximal outlet is moved along the channel.

13. An adjustable jet system, comprising:

a housing with a distal inlet at a distal end of the housing and a proximal outlet at a proximal end of the housing, the proximal end of the housing comprising a channel, the proximal outlet laterally adjustable along a width of the proximal end of the housing, with the proximal outlet maintaining a constant depth with respect to the proximal end of the housing as the proximal outlet is laterally adjusted along the width of the proximal end of the housing, and wherein an angular adjustment of the proximal outlet with respect to the distal inlet is at least 30°; and a tube to fluidly couple the distal inlet to the proximal outlet, the tube formed of a distal portion of tubing and a proximal portion of tubing, the distal portion of tubing and the proximal portion of tubing in telescoping connection.

14. The adjustable jet system of claim 13, wherein the proximal end of the housing further comprises a selectively sealable channel formed therein, and wherein the proximal outlet is moveable within the selectively sealable channel to adjust a position of the proximal outlet within a channel.

15. The adjustable jet system of claim 13, further comprising:

a distal joint in connection with the distal inlet and the distal portion of tubing to rotatably connect the distal portion of tubing to the distal inlet; and a proximal joint in connection with the proximal outlet and the proximal portion of tubing to rotatably connect the proximal portion of tubing to the proximal outlet.

16. The adjustable jet system of claim 15, wherein, as the proximal outlet is moved from a first position within the channel to a second position within the channel, the telescoping connection of the distal portion of tubing and the proximal portion of tubing adjusts a length of the tube from a first length to a second length.

17. The adjustable jet system of claim 16, wherein the distal joint comprises an eyeball joint and the proximal joint comprises an eyeball joint.

* * * * *